United States Patent [19]

Chassaing et al.

[11] Patent Number: 5,220,421

[45] Date of Patent: Jun. 15, 1993

[54] MULTICHANNEL ENCODING METHOD

[75] Inventors: Francoise Chassaing, La Chapelle des Fougeretz; Bruno Choquet, Rennes, both of France

[73] Assignees: France Telecon; Telediffusion de France, both of France

[21] Appl. No.: 820,406

[22] Filed: Jan. 15, 1992

[30] Foreign Application Priority Data

Jan. 16, 1991 [FR] France .................. 91 00444

[51] Int. Cl.$^5$ .................. H04N 13/00; H04N 13/02
[52] U.S. Cl. .................. 358/88; 358/133
[58] Field of Search .................. 358/88, 91, 92, 3, 133, 358/105, 135, 136

[56] References Cited

U.S. PATENT DOCUMENTS 4,905,081  2/1990  Morton .................. 358/88
5,043,806  8/1991  Choquet .................. 358/91

FOREIGN PATENT DOCUMENTS 0267000  5/1988  European Pat. Off. .

OTHER PUBLICATIONS

Kenichi Asano, "Picture Encoding Transmission System", Patent Abstracts of Japan, vol. 12, No. 449, Nov. 25, 1988.
Hisayuki Tanoi, "Adaptive Frame Interpolation System for Inter-Frame Prediction Decoder With Movement Compensation", Patent Abstracts of Japan, vol. 15, No. 082, Dec. 10, 1990.
Satoshi Fujita, "High-Definition Television Receiver", Patent Abstracts of Japan, vol. 13, No. 371, Aug. 17, 1989.
Nariaki Izumioka, "Parallax Compensating Method", Patent Abstracts of Japan, vol. 14, No. 312, Jul. 5, 1990.
Bruno Choquet, "Présentation du projet européen de recherche Cost 230 sur la télévision stéréoscopique", ONDE Electrique, vol. 71, No. 1, Jan. 16, 1991, pp. 7-36.

Primary Examiner—Howard W. Britton
Attorney, Agent, or Firm—Wegner, Cantor, Mueller & Player

[57] ABSTRACT

In a multichannel encoding method for encoding digitized pictures, in particular digitized stereoscopic television pictures, the digitized pictures are processed in different channels comprising at least a movement estimation channel to provide digitized picture encoding data. A particular processing channel is chosen on the basis of this encoding data. In the movement estimation channel an input digitized picture is divided into blocks of pixels to provide a movement vector for each block and an error for each block pixel. For each block, a set of values is calculated relative to a block mean error, a block error standard deviation, a block error mean deviation and an amplitude of the block movement vector to choose the particular processing channel assigned to said block on the basis of the set of values.

2 Claims, 2 Drawing Sheets

MULTICHANNEL ENCODING METHOD

BACKGROUND OF THE INVENTION

1. Field of the Invention

The invention concerns television systems and in particular stereoscopic television systems. The invention concerns a multichannel encoding method for encoding digitized pictures, in particular digitized stereoscopic television pictures.

2. Description of the Prior Art

The function of a stereoscopic television system is to render the impression of depth on a screen, for example a television screen, on the basis of a stereoscopic analysis of an observed scene. This stereoscopic analysis provides pictures for the righthand view (righthand sequence) and pictures for the lefthand view (lefthand sequence) at a video frequency of 50 Hz, for example, using two frames per picture.

Stereoscopic television systems must allow for economic and technical constraints. In particular, stereoscopic television systems must integrate into an existing environment of television systems. Thus a stereoscopic television system must be compatible with the transmission standard (the MAC standard in this instance) and the transmitted signal (compatible signal) must be displayable directly on a conventional television screen.

To meet these constraints the original righthand and lefthand picture sequences can only be transmitted in part, the untransmitted part having to be reconstituted in the decoder of the stereoscopic television receiver to obtain a stereoscopic display. To achieve a high degree of compatibility the choice may be made to transmit only one sequence of pictures (the righthand or lefthand sequence) but it is preferable to transmit a sequence of pictures resulting from the multiplexing of picture sequences (righthand and lefthand with compatible image enhancement processing) to favor stereoscopic output.

The basic reconstitution algorithm is a movement compensation algorithm applied to digitized television pictures subdivided into blocks of pixels (picture elements). This algorithm works correctly for blocks containing small or moderate movement. Blocks containing large or irregular movement are not well reconstituted, however. Consequently, for these blocks containing large or irregular movement it is necessary to use other processing channels such as a filtered channel.

Multichannel encoding methods for encoding digitized high-definition television pictures are known in which the digitized pictures are processed simultaneously in different channels including a movement estimation channel and a filtered channel. The movement estimation channel provides a movement vector for each block of pixels. A digitized picture is reconstituted for each processing channel using interpolation filters for the filtered channel and using movement vectors for the movement estimation channel. The reconstituted pictures for each block of pixels are then compared with the original picture and the processing channel which gives the best result is chosen to transmit the block in question.

However, this "a posteriori" choice of a specific processing channel following reconstitution by all the processing channels is not feasible for digitized stereoscopic television pictures. For depth display the pictures are not all reconstituted where there is a source picture and consequently the comparison of a reconstituted picture and the source picture is not able to yield a result usable to choose the best processing channel "a posteriori". This is essentially because the stereoscopic source pictures are acquired at 50 Hz whereas the display is at 100 Hz.

One object of the invention is a new multichannel encoding method for encoding digitized television pictures, in particular digitized stereoscopic television pictures, enabling an "a priori" choice of processing channel to made on the basis of one decision for each block of pixels.

Another object of the invention is a method of this kind which favors the movement estimation channel to retain good definition in the stereoscopic picture.

SUMMARY OF THE INVENTION

The invention consists in a multichannel encoding method for encoding digitized pictures, in particular digitized stereoscopic television pictures, in which the digitized pictures are processed in different channels comprising at least a movement estimation channel to provide digitized picture encoding data and a particular processing channel being chosen on the basis of said encoding data, in which method an input digitized picture is divided in the movement estimation channel into blocks of pixels to provide a movement vector for each block and an error for each block pixel and, for each block, a set of values is calculated relative to a block mean error, a block error standard deviation, a block error mean deviation and an amplitude of the block movement vector to choose the particular processing channel assigned to said block on the basis of said set of values.

The encoding method in accordance with the invention therefore makes it possible to choose transmission and reconstitution by a compensated channel or by a filtered channel, the choice being based entirely on the results from the movement estimation channel. As will emerge later, the choice of the movement estimation channel is favored in the event of small or moderate movements or relatively large errors in respect of only a few pixels from a block.

Other features and advantages of the invention will emerge more clearly from the following description of one embodiment of the invention given with reference to the appended drawings.

DETAILED DESCRIPTION OF THE INVENTION

Figure 1:
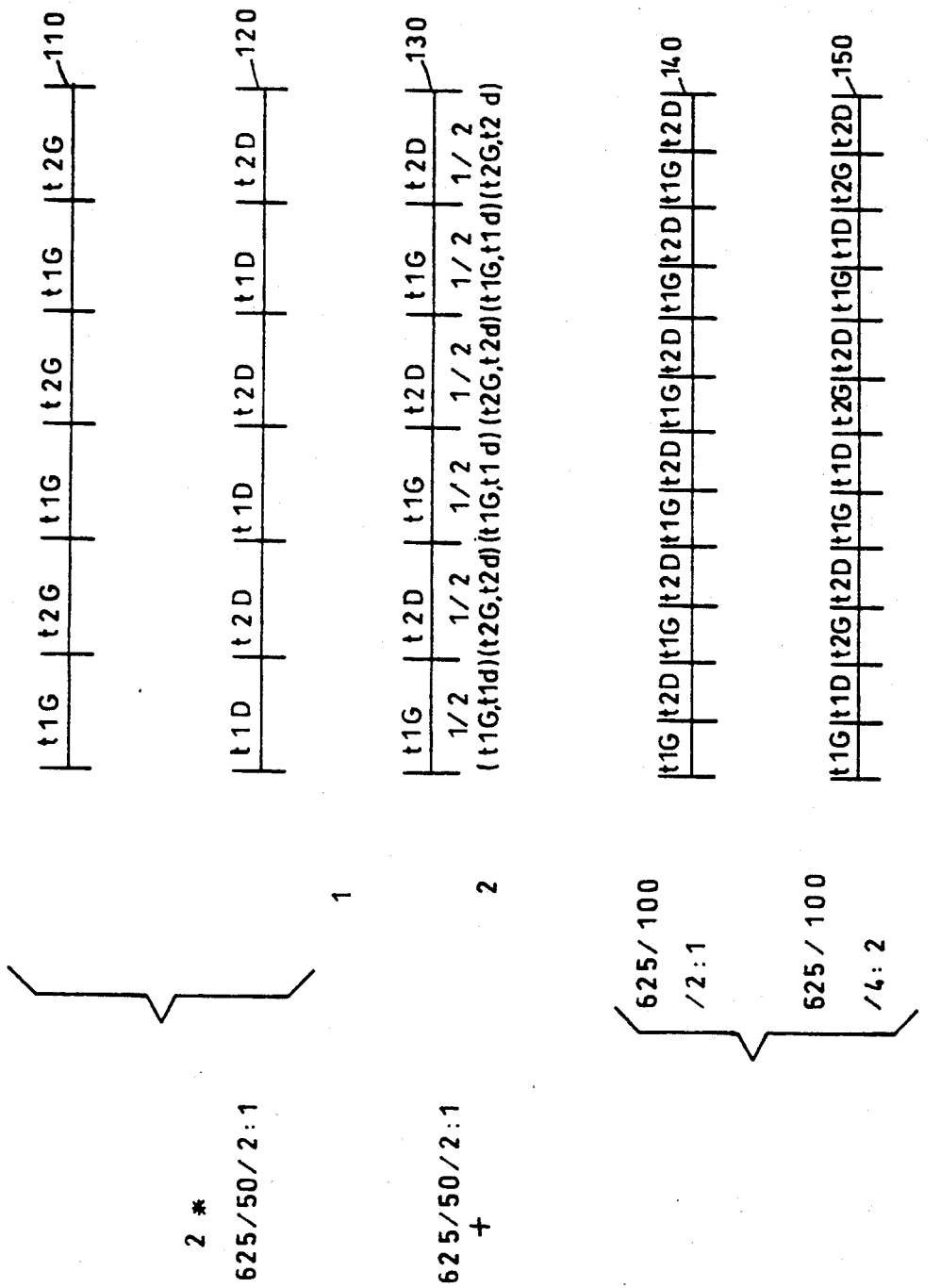
FIG. 1 shows the content of the stereoscopic television picture sequences for acquisition, transmission and display.

Referring to FIG. 1, a stereoscopic source (two cameras) provides simultaneously a lefthand picture sequence 110 and a righthand picture sequence 120, the two sequences having the same parity (625 lines, 50 Hz, second order interlacing).

Each block of the transmitted signal 130 represents either the time-division multiplexing of one frame from the lefthand sequence with one frame from the righthand sequence (in the case of the movement estimation channel) or point-to-point spatial multiplexing of half the pixels from the lefthand sequence with half the pixels from the righthand sequence (in the case of the filtered channel). Digital help data is produced when the source pictures enter the processing channels and is transmitted in parallel with the pictures via the transmission channel. As a result a single sequence of pictures (625 lines, 50 Hz, second order interlacing) and digital help data is transmitted based on the two sequences of source pictures.

For display, lefthand picture frames and righthand picture frames are processed alternately at 100 Hz to reconstitute two sequences of righthand and lefthand pictures. To produce the impression of depth each eye is made sensitive to a single sequence of pictures at 50 Hz using polarizing eyeglasses, for example. This figure shows two projection possibilities, one (140) in which an odd frame from the lefthand picture sequence is repeated after each picture at 100 Hz (625/100/2:1) and the other (150) in which an odd frame from the lefthand picture sequence is repeated after two pictures at 100 Hz (625/100/4:2).

The multichannel encoding method in accordance with the invention will now be described with reference to two processing channels, namely a movement estimation channel and a filtered channel; however, the man skilled in the art will have no difficulty in adapting the encoding method in accordance with the invention to cater for additional processing channels. In what follows the term "picture" refers to a digitized picture.

The pictures of the righthand and lefthand sequences are processed in the movement estimation channel to provide the encoding data to be transmitted, the transmission process being outlined hereinafter although it is well known to the man skilled in the art.

For the blocks of pixels from the lefthand picture sequence (of which only the odd transmitted frames are displayed), the movement estimation channel calculates movement vectors referring to the even picture frames, a movement vector representing a block of pixels. In reconstituting these untransmitted even frames the movement estimation channel produces an error for each pixel of a block representing a difference in levels referred to a scale of grey levels between a reconstituted pixel and an original pixel of a picture from the lefthand sequence, for example. On the other hand, reconstitution of the lefthand picture sequence by the filtered channel is of no utility as it does not provide any way to identify reconstitution errors.

For the blocks of pixels from the righthand picture sequence (no transmitted frame of which can be displayed directly) the processing applied by the estimation channel is identical to that previously described. However, the movement vectors are calculated at the location of the odd frames of the source pictures and the movement estimation channel produces an error for each pixel of a block representing a difference in level between two pixels respectively belonging to two successive odd frames. Once again, reconstitution of the righthand picture sequence by the filtered channel is of no utility.

The movement estimator used in the multichannel encoding method in accordance with the invention is preferably a "PEL RECURSIVE" estimator described in the article "New technique in Pel recursive motion compensation" by D. R. WALKER & K. R. RAO published in the journal "Proceedings ICC 84, Amsterdam, May 14–17, 1984, pages 703–706". After segmentation, the movement estimation channel supplies a movement vector for each block of pixels of the source pictures and a reconstitution error for each pixel of the block. The preferred size of the block of pixels is 8*8 pixels.

Figure 2:
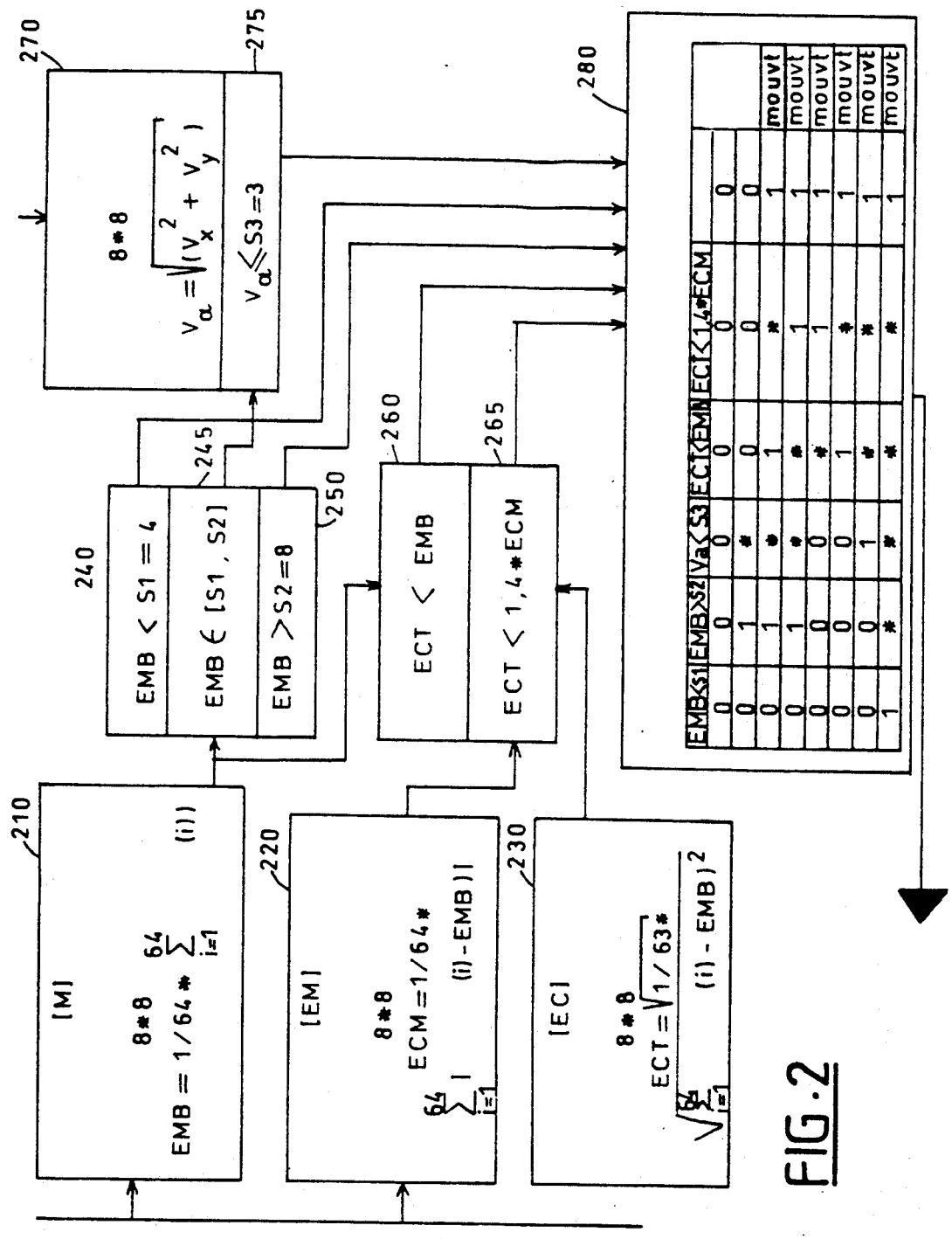
FIG. 2 is a flowchart showing some steps of the multichannel encoding method in accordance with the invention.

Referring now to FIG. 2, in the movement estimation channel the following equations are used to calculate a set of values for each block of pixels: a block mean error EMB (210), a block error standard deviation ECT (230), a block error mean deviation ECM (220) and an amplitude Va of the block movement vector (270):

$$EMB = 1/64 \cdot \sum_{i=1}^{64} \text{error}(i)$$

$$ECM = 1/64 \cdot \sum_{i=1}^{64} |\text{error}(i) - EMB|$$

$$ECT = \sqrt{1/63 \cdot \sum_{i=1}^{64} (\text{error}(i) - EMB)^2}$$

$$Va = \sqrt{Vx^2 + Vy^2}$$

and a particular processing channel (movement estimation channel or filtered channel) is assigned (280) to the block in question on the basis of the values of this set and in particular on the basis of comparing them with thresholds. The coordinates Vx, Vy of the block movement vector are referred to the frame of reference whose origin is the current pixel. Vx is measured along an axis parallel to the picture lines and Vy is measured in the direction perpendicular to the picture lines. The maximum displacement allowed for Vx is a displacement of ±15 pixels on the same line and between the preceding and following frames. The maximum displacement allowed for Vy is a displacement of ±16 lines between the previous and following frames.

The block mean error EMB is compared to a first threshold S1 and to a second threshold S2 higher than the first threshold S1. If EMB is less than the first threshold S1 (240), the processing channel chosen is the movement estimation channel. If EMB is between the thresholds S1, S2 (245) and the amplitude Va of the movement vector is less than the third threshold S3 (275), the processing channel chosen is the movement estimation channel. The movement estimation channel will again be chosen as the processing channel if the block error standard deviation ECT is less than EMB (260) or if ECT is less than the block error mean deviation ECM (265) preferably 1.4 times ECM. These latter two instances reflect the fact that only a few pixels from the block are subject to a serious error. Finally, if none of the previous cases applies the processing channel chosen is the filtered channel because large or irregular movements are then present in the block concerned.

To improve further the quality of stereoscopic output the final choice of the processing channel for a block takes account of the choice made for the surrounding blocks so as to homogenize the choice of processing channels to avoid sudden and repetitive transitions from one processing channel to the other.

There is claimed:

1. A multichannel encoding method for encoding digitized stereoscopic television pictures wherein sequences of left-handed and right-handed frames forming the digitized pictures are processed in different channels including at least a movement estimation channel and at least one other processing channel, said method comprising the steps of:

inputting each digitized sequence into the movement estimation channel;

dividing each input digitized sequence in said movement estimation channel into blocks of pixels to obtain a movement vector for each block and an error for each block pixel;

calculating a set of values for each block, including a block mean error, a block error standard deviation, a block error mean deviation and an amplitude of the block movement vector;

comparing each said set of values to a set of predetermined threshold values;

selecting a particular processing channel to be assigned to each block based upon the comparison; and reconstituting said digitized stereoscopic television pictures according to selected channels.

2. Method according to claim 1 wherein said movement estimation channel is chosen when:

the block mean error is less than a first threshold value;

the block mean error is between the first threshold value and a second threshold value greater than the first threshold value and the amplitude of the block movement vector is less than a third threshold value;

the block error standard deviation is greater than the block mean error;

the block error standard deviation is greater than the block error mean deviation.

* * * * *